Patented May 1, 1945

2,375,023

UNITED STATES PATENT OFFICE 2,375,023

SEPARATION OF ISOMERS OF SUBSTITUTED POLY-OLEFINIC COMPOUNDS

Rupert C. Morris and John L. Van Winkle, Berkeley, Calif., assignors to Shell Development Company, San Francisco, Calif., a corporation of Delaware No Drawing. Application May 26, 1943, Serial No. 488,791

9 Claims. (Cl. 260—681.5)

This invention relates to the separation of isomers of polyolefinic compounds, and more particularly pertains to the concentration or separation of isomers of branched chain unsaturated hydrocarbons containing at least two olefinic linkages in conjugated position. In one of its more specific embodiments the invention relates to a process for the separation of unsaturated hydrocarbons having the structural formula

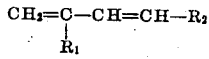

from hydrocarbon mixtures containing such unsaturated hydrocarbon and the corresponding unsaturated hydrocarbon having the structural formula

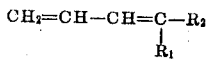

In the above formulae, $R_1$ and $R_2$ represent hydrocarbon radicals which may be alkyl, aryl, alkaryl, aralkyl or alicyclic radicals. In one of its most specific embodiments, the invention is directed to a novel process for the efficient separation into its components of mixtures comprising 2-methyl pentadiene-1,3 and 4-methyl pentadiene-1,3.

It has been recently proposed to produce poly-olefinic compounds from carbonylic compounds by first reacting the carbonylic compound, i. e. an aldehyde or a mono- or poly-ketone, either with itself or with another carbonylic compound to produce an aldol, ketol or ketaldol, then hydrogenating this aldol, ketol or ketaldol to form a dehydratable poly-hydroxy compound, and finally catalytically dehydrating the poly-hydroxy compound to the desired poly-olefinic compound. More specifically, and with particular reference to the production of methyl pentadienes, it has been proposed to bring acetone into contact with a solid basic condensation catalyst, e. g. alkali bicarbonates, carbonates, acetates, cyanides and/or alcoholates, to form diacetone alcohol, reacting the diacetone alcohol thus produced with hydrogen in the presence of, for example, a hydrogenation catalyst, such as pyrophoric nickel metal catalyst, under a superatmospheric pressure and at a temperature of between about 50° C. and about 125° C. to form diacetone glycol, and catalytically dehydrating the diacetone glycol as, for instance, by heating it at a temperature below its boiling point in the presence of iodine or hydrogen chloride to convert at least a part of the diacetone glycol to methyl pentadienes. When effected in accordance with the above outlined process, the hexadienes formed consist of or at least comprise a mixture of two structural isomers, namely 2-methyl pentadiene-1,3 and 4-methyl pentadiene-1,3.

It is an object of the present invention to separate the above formed hexadiene mixture into its component parts. A further object of the invention is to provide a process for the economical separation of isomers of alkylated pentadienes containing conjugated double bonds. A still further object is to separately recover the individual isomers of branched chain poly-olefins containing conjugated double bonds.

It has now been discovered that the above and other objects may be attained by reacting the mixtures of the above defined aliphatic poly-olefinic compounds with sulfur dioxide under conditions whereby sulfolenes (i. e. cyclic sulfone compounds) of one of the isomers are preferentially formed. More specifically stated, it has been discovered that the rate of reaction between certain poly-olefinic compounds and sulfur dioxide to form the corresponding sulfolenes is faster than that of the corresponding reaction between other structural isomers of the same poly-olefinic compound. For instance, as will be brought out hereinbelow, it has been discovered that 2-methyl pentadiene-1,3 reacts very rapidly with sulfur dioxide to form the corresponding sulfolene, namely 2,4-dimethyl-3-sulfolene. At the same time, it was found that under the same operating conditions a considerably longer period of time and/or more rigorous operating conditions are required to form the sulfolene by the interaction of the sulfur dioxide with 4-methyl pentadiene-1,3, which is a structural isomer of the mentioned 2-methyl pentadiene-1,3. Therefore, when a mixture of the two isomeric branched chain hexadienes is reacted with sulfur dioxide under conditions favoring sulfone formation, e. g. at a superatmospheric pressure and an elevated temperature which is, however, below the temperature at which the corresponding sulfone or sulfones decompose, it is possible to convert substantially all of the 2-methyl pentadiene-1,3 to the corresponding sulfolene (i. e. 2,4-dimethyl-3-sulfolene), while substantially all or at least a major portion of its isomer, i. e. the 4-methyl pentadiene-1,3, remains substantially unaffected and may be readily separated from the reaction mixture as by fractional distillation. If desired, the 2-methyl pentadiene-1,3 may then be recovered as such by heating the separated sulfolene to a temperature at which the latter decomposes into its constituent parts, namely the methyl pentadiene and sulfur dioxide.

Although the above outlined process is particularly applicable to a separation of mixtures comprising or consisting of the mentioned branched chain hexadienes, i. e. 2-methyl pentadiene-1,3 and 4-methyl pentadiene-1,3, the invention may also be used for the separation or concentration of isomers of other poly-olefinic compounds containing at least two olefinic linkages in conjugated position. For instance, the process may be used for the separation of poly-olefinic compounds having the structural formula

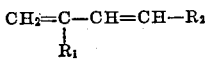

wherein $R_1$ and $R_2$ are hydrocarbon radicals, from the corresponding poly-olefins having the general structural formula

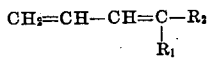

in which $R_1$ and $R_2$ are hydrocarbon radicals which are the same as those in the first mentioned formula. A particularly suitable group of hydrocarbons which may be separated into its component parts by the process of the present invention comprises a mixture of the above-mentioned poly-olefinic hydrocarbons in which the radical $R_1$ is an alkyl chain. The invention finds particular utility in the separation of hydrocarbon mixtures predominating in or consisting of a mixture of conjugated dienes having the following general structures:

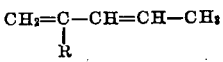

and

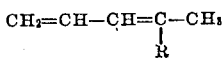

wherein R is a hydrocarbon radical, and preferably an alkyl, e. g. methyl, ethyl, n-propyl, isopropyl, n-butyl, isobutyl, pentyl, etc. radical, which may or may not be further substituted.

As mentioned above it was discovered that the rate of addition of sulfur dioxide to the different structural isomers of a given acyclic polyolefin having conjugated double bonds is not the same, so that it is possible to isolate individual isomers of the poly-olefins by regulating the reaction time. Although the mol ratio of the sulfur dioxide to the poly-olefins may vary within relatively wide limits, in order to separate a given poly-olefin, e. g. 2-methyl pentadiene-1,3, from the corresponding structural isomer thereof, i. e. 4-methyl pentadiene-1,3, it is preferable to employ the sulfur dioxide in an amount in excess of that necessary for the conversion of the poly-olefin which has a greater rate of reaction to the corresponding mono-sulfolene. In order to prevent or inhibit the formation of amorphous poly-sulfones which do not readily yield the corresponding poly-olefins when subjected to ordinary processes of decomposition, the hydrocarbon fraction to be treated in accordance with the process of the present invention, prior to its reaction with sulfur dioxide must preferably be first treated to remove any organic peroxides which may be present therein. It is well known that olefinic hydrocarbons and particularly the fractions which contain relatively high percentages of poly-olefins, e. g. di-olefins, are quite reactive and ordinarily tend to form organic peroxides even by mere contact with air at ordinary temperatures and pressures. Therefore, even after a hydrocarbon fraction, which is to be treated in accordance with the present process to separate one or more poly-olefinic hydrocarbons from the corresponding isomer or isomers, has been treated for the removal or decomposition of the organic peroxides present therein, it is desirable if not essential to prevent any further formation of the organic peroxides in the interim between the purification step and the time when the peroxide-free hydrocarbons are reacted with sulfur dioxide under conditions favorable to the selective formation of the monomeric sulfolenes of the desired poly-olefin or poly-olefins present therein. This may be effected by reacting these hydrocarbons with the sulfur dioxide substantially immediately after the removal of the peroxides therefrom, by the addition of inhibitors, such as pyrogallol, hydroquinone, p-tertiary butylcatechol, pyrocatechol, or the like, to the purified hydrocarbon fractions, by storage in an inert atmosphere, and/or by employing other known and suitable means or methods of inhibiting peroxide formation.

In accordance with the present process it is preferred to effect the treatment of the hydrocarbon mixtures with sulfur dioxide in the liquid phase or at least under such conditions that the reactants are predominantly in the liquid state. In the case of most of the acyclic poly-olefins the reaction temperature should be maintained in the neighborhood of 100° C. However, somewhat higher or lower temperatures may also be employed. When the operating temperature drops too low, the addition reaction, even with those poly-olefins which have a relatively high reaction rate, becomes so slow as to render the process uneconomical. On the other hand, care should be taken to prevent the use of excessively high temperatures, at which decomposition of the sulfones occurs. Also, although the reactants may be at pressures which are only sufficient to maintain them in the liquid state at the operating temperature employed, higher pressures may also be used. In this connection it must be noted that the reaction pressure is generally considerably higher than that at which the reactants are introduced into the reaction vessel. This is due to the fact that it is generally preferable to effect the introduction of the reactants at or below ordinary temperatures, whereas the reaction temperature is in the neighborhood of 100° C. As a general rule, the reaction pressures thus generated in the autoclave are between about 100 and about 500 lbs. per sq. in. or even higher, depending in part on the specific poly-olefins treated.

The residence time will vary depending on the specific poly-olefinic mixtures which are treated in accordance with the process of the present invention and is at least in part dependent upon the temperature and pressure employed. In general, it may be stated that the period of time during which the poly-olefinic hydrocarbons and the sulfur dioxide are subjected to the reaction temperatures and pressures, i. e. the residence time, should be sufficient to cause a substantially complete addition reaction between one of the isomers of the poly-olefins treated, but insufficient to effect any substantial or even noticeable reaction between the sulfur dioxide and the other poly-olefinic hydrocarbon or hydrocarbons (e. g. the corresponding structural isomers) present in the treated mixture.

The process of the present invention is illustrated by the following examples, which are not to be considered as limiting the invention to the particular application or other conditions of operation or apparatus disclosed.

Example I

A freshly distilled and carefully fractionated hexadiene fraction having a boiling point of 75.8° C. at 763.5 mm. mercury and a refractive index $n-20/D=1.4449$, which fraction therefore consisted substantially exclusively of 2-methyl pentadiene-1,3, was employed. This hydrocarbon fraction and sulfur dioxide were separately liquefied by chilling and by maintaining them at a superatmospheric pressure of about 20 lbs. per sq. in. gage. These reactants were then introduced into an evacuated bomb reactor in a mol ratio of about 5.88 mols of sulfur dioxide per mol of methyl pentadiene. The reactor was then closed and placed into boiling water so as to maintain the reaction temperature within the reactor at about 100° C. for a period of about 10 minutes. Thereafter the reactor was cooled and the unreacted gases were released. An analysis of the remaining reaction product indicated that approximately 93.6% of the 2-methyl pentadiene-1,3 reacted with sulfur dioxide to form 2,4-dimethyl-3-sulfolene, i. e.,

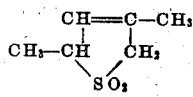

the melting point of which is between about 38.5° C. and about 39.5° C.

Example II

A run was effected in the same apparatus as that outlined in the previous example. As in Example I, 2-methyl pentadiene-1,3 was reacted in a closed vessel and at 100° C. with sulfur dioxide. However, in this case, the mol ratio of the diene to the sulfur dioxide was 1:4.55, and the reaction was continued for about 46 minutes. An analysis of the reaction products showed that the yield of the above-mentioned sulfolene was equal to 95.8%.

Example III

Three runs were made in which a freshly distilled peroxide-free hexadiene fraction, essentially comprising 4-methyl pentadiene-1,3, was reacted with sulfur dioxide. In all of these runs approximately 4.32 mols of sulfur dioxide were employed per mol of the diene. In each case the poly-olefinic hydrocarbon and the sulfur dioxide were separately liquefied by chilling and maintaining the pressure at about 20 lbs. per sq. in. gage. The liquefied reactants were introduced into an evacuated bomb, which was then closed and placed into boiling water so as to maintain the reaction temperature within the reactor at about 100° C. The first run was conducted for a period of 45 minutes, the second for about 2 hours, and the third for about 8 hours. In each case, after the termination of the reaction, the reactor was cooled, the unreacted gases were released, and the remaining reaction product was analyzed to determine the yield of the sulfolene produced. The yields for the three runs are presented below:

| Reaction time | Yield |
| --- | --- |
|  | Per cent |
| 45 minutes | 13.2 |
| 2 hours | 79.7 |
| 8 hours | 84.3 |

A comparison of the above yields with those obtained in the runs described in Examples I and II clearly shows the difference in the rate of addition reaction between sulfur dioxide and 2-methyl pentadiene-1,3 on the one hand, and sulfur dioxide and 4-methyl pentadiene-1,3 on the other. It is seen that even after 8 hours of interaction between the 4-methyl pentadiene-1,3 and the sulfur dioxide, the yield was below that which was obtained during a 10 minute reaction between sulfur dioxide and the 2-methyl pentadiene-1,3. Also, whereas substantially all of the 2-methyl pentadiene-1,3 reacted with sulfur dioxide within 45 minutes, only a small amount of the 4-methyl isomer would react within the same period of time.

Example IV

A hydrocarbon mixture consisting of 2-methyl pentadiene-1,3 and 4-methyl pentadiene-1,3 was liquefied and introduced into an evacuated bomb reactor into which liquefied sulfur dioxide was conveyed. Approximately 22.95 mols of the above hydrocarbon fraction and about 91.78 mols of liquid sulfur dioxide were thus introduced into the reactor. The mol ratio of the sulfur dioxide to the acyclic hexadienes was therefore equal to 1:4.00. The reactor was then closed and placed into boiling water so as to bring the reaction temperature within the reactor to about 100° C. with a corresponding increase in the pressure within the reactor. The reaction was continued for a period of about 44 minutes. An analysis of the reaction products showed that the yield of sulfolenes was 85.2%, the unreacted poly-olefins consisting primarily of the 4-methyl pentadiene-1,3 present in the charging hydrocarbon fraction. The 2,4-dimethyl-3-sulfolene formed was then subjected to heating at a pressure of about 55 m. of mercury. Decomposition started at about 85° C. and the kettle temperature rose up to about 120° C. Substantially quantitative decomposition of the sulfolene into sulfur dioxide and 2-methyl pentadiene-1,3 was obtained, this hexadiene being then separated in a substantially pure form from the sulfur dioxide by any known means, e. g. fractionation.

The above example presents a ready method for the separation of 2-methyl pentadiene-1,3 from 4-methyl pentadiene-1,3. The same procedure may be employed for the separation from each other of other isomeric poly-olefinic, and particularly diolefinic, hydrocarbons having double bonds in conjugated position.

We claim as our invention:

1. A process for separating a hexadiene fraction into its constituent hexadienes, which comprises mixing a liquefied substantially peroxide-free hexadiene fraction essentially consisting of 2-methyl pentadiene-1,3 and 4-methyl pentadiene-1,3 with liquefied sulfur dioxide in a mol ratio of at least 4 mols of sulfur dioxide per mol of the hexadienes, subjecting the mixture thus formed to a temperature of about 100° C. under a pressure of between about 100 pounds per sq. in. gage and about 500 pounds per sq. in. gage, effecting the reaction for a period of time sufficient to effect an addition reaction between the sulfur dioxide and substantially all of the 2-methyl pentadiene-1,3 present in the mixture, but insufficient to effect any substantial reaction between the sulfur dioxide and the 4-methyl pentadiene-1,3, thereby obtaining a reaction mixture containing sulfur dioxide, the unreacted 4-methyl pentadiene-1,3 and 2,4-dimethyl-3-sulfolene, separately recovering the unreacted 4-methyl pentadiene-1,3, decomposing the 2,4-dimethyl-3-sulfolene into a mixture comprising 2-methyl pentadiene-1,3 and sulfur dioxide, and recovering the 2-methyl pentadiene-1,3 from said last-mentioned mixture.

2. A process for separating a hexadiene mixture comprising 2-methyl pentadiene-1,3 and 4-methyl pentadiene-1,3 into its constituent hexadienes, which comprises reacting said hexadiene mixture, at a temperature of about 100° C. and under a pressure of between about 100 pounds per sq. in. gage and about 500 pounds per sq. in. gage, with sulfur dioxide employed in a mol ratio of at least 4 mols of the sulfur dioxide per mol of the hexadienes, effecting said reaction for a period of time sufficient to effect an addition reaction between the sulfur dioxide and substantially all of the 2-methyl pentadiene-1,3 present in the mixture, but insufficient to effect any substantial reaction between the sulfur dioxide and the 4-methyl pentadiene-1,3, thereby obtaining a reaction mixture containing sulfur dioxide, the unreacted 4-methyl pentadiene-1,3 and 2,4-dimethyl-3-sulfolene, separately recovering the unreacted 4-methyl pentadiene-1,3, decomposing the 2,4-dimethyl-3-sulfolene into a reaction mixture comprising 2-methyl pentadiene-1,3 and sulfur dioxide, and recovering the 2-methyl pentadiene-1,3 from said last-mentioned mixture.

3. A process for the separation of 4-methyl pentadiene-1,3 from a mixture thereof with 2-methyl pentadiene-1,3, which comprises reacting said mixture, at a temperature of about 100° C. and at a pressure of between about 100 lbs. per sq. in. gage and about 500 lbs. per sq. in. gage, with sulfur dioxide employed in a mol ratio of at least 4 mols of the sulfur dioxide per mol of the hydrocarbon mixture treated, effecting said reaction for a period of time sufficient to convert substantially all of the 2-methyl pentadiene-1,3 present in the mixture into 2,4-dimethyl-3-sulfolene, but insufficient to effect any substantial addition reaction between the sulfur dioxide and the 4-methyl pentadiene-1,3, and separating the 4-methyl pentadiene-1,3 from the resulting reaction mixture.

4. A process for the separation of 2-methyl pentadiene-1,3 from a peroxide-free hexadiene mixture comprising 2-methyl pentadiene-1,3 and 4-methyl pentadiene-1,3, which comprises reacting said peroxide-free hexadiene mixture, at a temperature of about 100° C. and at a pressure of between about 100 lbs. per sq. in. gage and about 500 lbs. per sq. in. gage, with sulfur dioxide employed in a mol ratio of at least 4 mols of the sulfur dioxide per mol of the hexadiene mixture, effecting said reaction for a period of time sufficient to convert substantially all of the 2-methyl pentadiene-1,3 to 2,4-dimethyl-3-sulfolene but insufficient to cause any substantial reaction between the sulfur dioxide and the 4-methyl pentadiene-1,3, separating the 2,4-dimethyl-3-sulfolene from the reaction mixture, decomposing the 2,4-dimethyl-3-sulfolene into a mixture essentially consisting of sulfur dioxide and 2-methyl pentadiene-1,3, and recovering said 2-methyl pentadiene-1,3 from the last-mentioned mixture.

5. A process for the separation of 4-methyl pentadiene-1,3 from a mixture thereof with 2-methyl pentadiene-1,3, which comprises reacting said mixture at an elevated temperature and under a superatmospheric pressure sufficient to maintain the reactants in the liquid state with sulfur dioxide employed in an amount in excess of that necessary to combine with the 2-methyl pentadiene-1,3, effecting said reaction for a period of time sufficient to cause an addition reaction between the sulfur dioxide and the 2-methyl pentadiene-1,3 but insufficient to cause any substantial interaction between the sulfur dioxide and the 4-methyl pentadiene-1,3, and separating the 4-methyl pentadiene-1,3 from the reaction mixture.

6. The process according to claim 5, wherein the unsaturated cyclic sulfone formed by the interaction of the sulfur dioxide with the 2-methyl pentadiene-1,3 is subjected to decomposition to form a mixture essentially consisting of sulfur dioxide and 2-methyl pentadiene-1,3, and wherein said methyl pentadiene is separately recovered.

7. A process for the separation of 2-methyl pentadiene-1,3 from a mixture thereof with 4-methyl pentadiene-1,3, which comprises reacting said mixture at an elevated temperature and under a superatmospheric pressure sufficient to maintain the reactants in the liquid state with sulfur dioxide employed in an amount in excess of that necessary to combine with the 2-methyl pentadiene-1,3, effecting said reaction for a period of time sufficient to convert substantially all of the 2-methyl pentadiene-1,3 to 2,4-dimethyl-3-sulfolene, but insufficient to cause any substantial reaction between the sulfur dioxide and the 4-methyl pentadiene-1,3, separating the 2,4-dimethyl-3-sulfolene from the reaction mixture, decomposing said sulfolene into a mixture essentially consisting of sulfur dioxide and 2-methyl pentadiene-1,3, and recovering said methyl pentadiene from the last-mentioned mixture.

8. A process for the concentration of a hydrocarbon mixture comprising structural isomers of a substituted pentadiene, which comprises contacting a hydrocarbon fraction consisting of a mixture of structurally isomeric poly-olefins having the general structural formulae

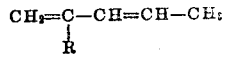

and

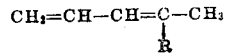

wherein R is an alkyl radical, with sulfur dioxide employed in an amount at least sufficient to react with the poly-olefins, reacting said mixture at an elevated temperature and under a superatmospheric pressure sufficient to maintain a liquid phase in the reaction zone for a period of time sufficient to effect an addition reaction between the sulfur dioxide and the poly-olefin having the substituent in the 2-position but insufficient to effect any substantial addition reaction between the sulfur dioxide and the poly-olefin having the substituent in the 4-position, and separating the last-mentioned unreacted polyolefin from the reaction mixture.

9. A process for the concentration of mixtures comprising at least two structural isomers of a mono-branched-chain poly-olefinic compound containing two olefinic linkages in the 1- and 3-positions, one of said structural isomers having a single alkyl branched chain in the 2-position with respect to the first of the unsaturated carbon atoms while the second of said structural isomers contains a single alkyl branched chain in the 4-position, which comprises contacting said poly-olefinic mixture with sulfur dioxide employed in an amount sufficient to combine with the poly-olefins, subjecting the mixture to an elevated temperature and to a superatmospheric pressure sufficient to maintain a liquid phase in the reaction zone, effecting the reaction for a period of time sufficient to effect the addition reaction between the sulfur dioxide and one of the poly-olefinic isomers present in the mixture treated but insufficient to effect any substantial interaction between the sulfur dioxide and the other structural isomer present therein, and separating the unreacted poly-olefinic isomer from the reaction mixture thus formed.

RUPERT C. MORRIS.
JOHN L. VAN WINKLE.